March 16, 1965 A. R. CRAWFORD ETAL 3,173,458
BALANCING MACHINE
Original Filed Nov. 18, 1955 6 Sheets-Sheet 1

INVENTORS
ARTHUR R. CRAWFORD
THEODORE ONGARO
WALLACE R. RUSHIN
ROBERT E. ELLIS
BY LeBlanc & Shur
ATTORNEYS

INVENTORS
ARTHUR R. CRAWFORD
THEODORE ONGARO
WALLACE R. RUSHIN
ROBERT E. ELLIS
BY LeBlanc & Shur
ATTORNEYS March 16, 1965  A. R. CRAWFORD ETAL  3,173,458
BALANCING MACHINE
Original Filed Nov. 18, 1955  6 Sheets-Sheet 3

INVENTORS
ARTHUR R. CRAWFORD
THEODORE ONGARO
WALLACE R. RUSHIN
ROBERT E. ELLIS
BY LeBlanc + Shur
ATTORNEYS March 16, 1965 A. R. CRAWFORD ETAL 3,173,458
BALANCING MACHINE
Original Filed Nov. 18, 1955 6 Sheets-Sheet 4

INVENTORS
ARTHUR R. CRAWFORD
THEODORE ONGARO
WALLACE R. RUSHIN
ROBERT E. ELLIS
BY LeBlanc & Shur
ATTORNEYS March 16, 1965 A. R. CRAWFORD ETAL 3,173,458
BALANCING MACHINE
Original Filed Nov. 18, 1955 6 Sheets-Sheet 5

INVENTORS
ARTHUR R. CRAWFORD
THEODORE ONGARO
WALLACE R. RUSHIN
ROBERT C. ELLIS
BY
LeBlanc & Shur
ATTORNEYS

United States Patent Office 3,173,458
Patented Mar. 16, 1965

3,173,458
BALANCING MACHINE
Arthur R. Crawford, Theodore Ongaro, Wallace R. Rushin, and Robert E. Ellis, all of Columbus, Ohio, assignors to International Research and Development Corp., Columbus, Ohio, a corporation of Ohio
Original application Nov. 18, 1955, Ser. No. 547,609, now Patent No. 2,970,478, dated Feb. 7, 1961. Divided and this application Feb. 1, 1960, Ser. No. 11,399
11 Claims. (Cl. 141—67)

This is a division of application Serial No. 547,609, filed November 18, 1955, now U.S. Patent No. 2,970,478.

This invention relates to balancing machines and more particularly relates to an improved machine for rapidly balancing abrasive wheels.

Unbalance in an abrasive wheel and its effect can be simply depicted by a simple illustration. Consider a steel ball supported on a string and swung around to describe a complete circle of motion. If the string is suddenly released, the ball and string fly off in a straight path tangent to the circle with a force which is determined by the weight of the ball and the speed with which it is spinning when released. Unbalance in an abrasive wheel operates in a similar manner and tends to pull the wheel off its rotational center. The purpose of balancing is to reduce the force to a minimum value.

The theory of balance is to simply place a ball of equal apparent weight (the product of weight times the distance from the center of rotation) directly opposite the original ball of unbalance. In practice the problem is not quite so clearly defined in view of the fact that the ball of unbalance may be a difference in density of wheel structure, air inclusions, etc. and one must resort to different means to locate this point of weight concentration.

The machines heretofore utilized to accomplish this job in a dynamic fashion have largely been general purpose balancing machines or, in a number of instances, have been general purpose balancing machines modified somewhat for use with abrasive wheels. As is usually the case with universal machines, certain short comings are experienced in relation to the specific abrasive wheel job and, generally speaking, the balance operation is so slow as to preclude the economic balancing of all mass produced abrasive wheels.

Static balancing is also relied upon to a considerable extent and comprises the steps of mounting the wheel upon a shaft, allowing the wheel to settle, removing the wheel from the shaft, applying calcium carbonate or some similar material to the light side of the wheel by means of a sponge, baking out the water, remounting the wheel back on the shaft and again allowing the wheel to settle to check the accuracy of the balance.

With either method of operation the job consumes a minimum of five minutes and frequently runs to 10. The methods are completely manual and as a result it has been economically feasible to balance only special purpose or precision wheels.

According to the present invention an abrasive wheel is quickly and accurately mounted on a spindle, is brought up to a predetermined speed of rotation, simple readings on the position and amount of unbalance are taken, the wheel is braked to a halt, and an automatic loader applies the necessary corrective weight while the wheel is still mounted on the machine. The wheel is then again brought up to speed, checked, and braked to halt in a total time of approximately 40 seconds. No baking or further treatment is necessary.

The amount and position of unbalance is determined electronically through the use of an alternating voltage generated by a pick up which responds to the physical motion of the balancing spindle to which it is attached. The amplitude of this alternating voltage is directly proportional to the motion of the spindle and the frequency is exactly equal to the spindle rotational speed, which is constant.

Assume that at the maximum positive value of the alternating voltage the heavy spot on the abrasive wheel has reached a point directly opposite the pick-up. A definite time relation is then established between the alternating voltage and the physical location of the unbalance. This relation is purely arbitrary, but once determined for and by a given system it remains constant. The alternating voltage is used to fire a light each time, for example, the maximum positive value is reached and the stroboscopic principle is used to visually stop the rotation of a disc which rotates at spindle speed. The disc contains a narrow slit behind which a circular neon tube is mounted and the tube is fired stroboscopically as hereinabove described with the slit appearing as a stationary red line. If the abrasive wheel is then rotated by hand until the slit is in the same position as was observed for the red line, a physical location of the heavy spot is established with respect to the pick-up mounted on the spindle. After this heavy spot has been located the automatic loader is utilized to add weight to the light spot diametrically opposite this position to bring the wheel into a condition of balance. The novel loading step is extremely brief and, instead of relying on a wet application of loading material with a subsequent baking, comprises dynamically injecting a substantially dry powder into the porous wheel structure in the form of an aerosol dispersion.

It is accordingly a primary object of the present invention to provide an improved abrasive wheel balancing machine capable of accurately balancing abrasive wheels within a short period of time.

It is another object of the invention to provide an improved abrasive wheel balancing machine wherein the entire operation of determining the position of unbalance and balancing the wheel may be accomplished without removing the wheel from the machine.

It is another object of the invention to provide an improved abrasive wheel balancing machine utilizing a novel automatic wheel loader.

It is another object of the present invention to provide a quick acting loader for injecting an aerosol dispersion of a powder into the porous structure of an object to be balanced.

It is another object of the invention to provide a novel method of loading porous objects such as abrasive wheels.

It is another object of the invention to provide an improved abrasive wheel balancing machine which is rugged, reliable, accurate and simple in operation.

These and further objects and advantages of the invention will become apparent upon reference to the following specification and claims and appended drawings wherein:

Figure 1:
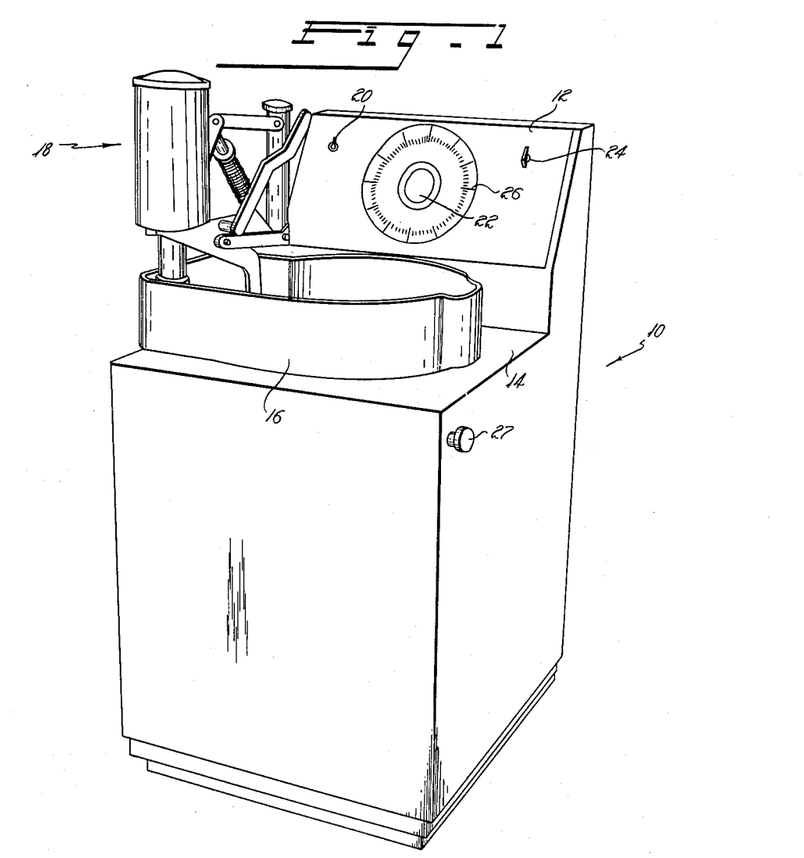
FIGURE 1 is a perspective view of a balancing machine constructed according to the present invention.

The balancing machine of this invention is comprised of a cabinet assembly shown generally at 10 in FIGURE 1 and consisting of a control panel 12, a table top 14, a protective guard 16 and a loader assembly 18. Mounted on the control panel 12 is an indicator light 20 for indicating when the power is on or off, an amplitude meter 22, for indicating the degree of unbalance, and a range selector switch 24. Surrounding the meter 22 is a graduated ring or scale 26 which is marked to correspond with the face of a clock. The ring provides a reference for phase determination with the scanning disc acting as a light source as shall be described in detail hereinafter. A power control switch 27 is provided on the side of the cabinet within easy reach of the operator.

*Drive system*

Figure 2:
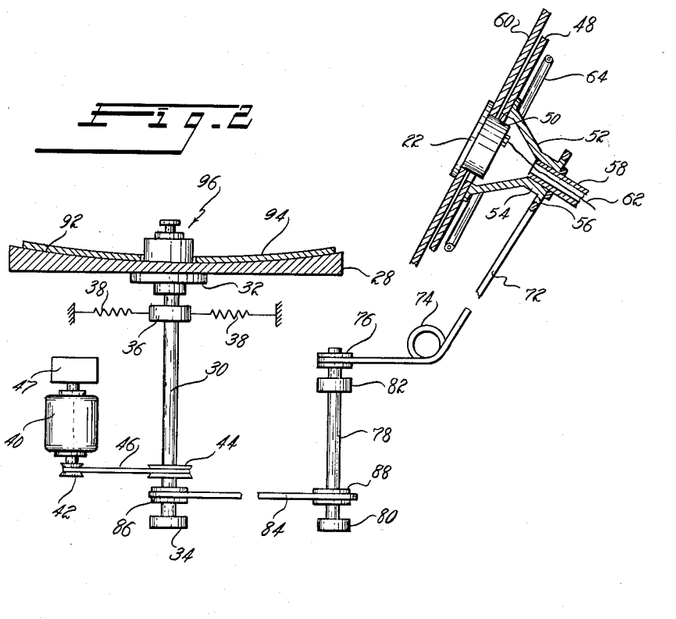
FIGURE 2 is a vertical cross section of the turn table and indicating mechanism and associated drives.

Referring to FIGURE 2, a turn table 28 is mounted on a vertical spindle 30 by means of a suitable fixture 32 and the spindle 30 is carried by a lower thrust bearing 34 and an upper floating bearing 36 which is suspended by springs 38. An electric motor 40 drives the spindle 30 by means of pulleys 42 and 44 and V belts 46 and is provided with an electrically actuatable brake 47.

The rotating disc 48 in the indicating assembly is apertured at its center at 50 and is carried by a cone shaped hub 52 which has a cylindrical bearing portion 54 carrying a timing gear 56 integral therewith. The bearing portion 54 is mounted upon a hollow pintle 58. The amplitude meter 22 is mounted in a transparent cover plate 60 and extends through the aperture 50 in the disc 48 into the space in the cone shaped hub 52. The lead wire 62 for the meter 22 extends through the hub 52 and through the hollow pintle 58. Directly behind the disc 48 there is mounted a circular neon tube 64 best seen in FIGURE 9.

Figure 3:
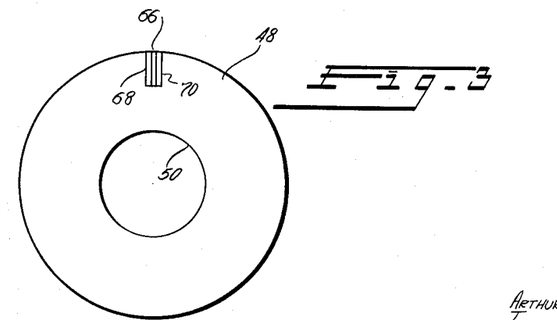
FIGURE 3 is a plan view of the disc used in the indicating mechanism.

The disc 48 is provided with a radial slit 66 at the edge thereof and is painted black across its entire front surface except for a pair of strips 68 and 70 on either side of the slit 66. When the disc is rotating during operation of the balancing machine the neon tube 64 in cooperation with the slit 66 in disc 48 creates the appearance of a stationary red line. After the turntable has been brought to rest the unpainted strips 68 and 70 serve as an easily visible marker to indicate the position of the slit 66.

The disc 48 and hub 52 are driven by means of a timing belt 72 which engages the teeth of timing gear 56 and passes over idler 74 to engage a further timing gear 76 on a jack shaft 78. The jack shaft 78 is carried in suitable bearings 80 and 82 and is driven by means of a further timing belt 84 mounted on timing gears 86 and 88 on pintle 30 and jack shaft 78 respectively. The disc 48 is driven at precisely the same speed as the turn table 28 and, because timing belts are used to connect the disc 48 to the turn table 28, these two elements maintain precise positional synchronism.

*Turn table*

Where dynamic balancing machines used for balancing rotating objects such as fly wheels and fans have been adapted for use with abrasive wheels, the abrasive wheels have been mounted for rotation in substantially the same manner as the fly wheels or fans. That is to say, the abrasive wheel is mounted upon an arbor by means of washers and a clamping nut and centering is provided through the use of various size collars having diameters equal to the nominal bore diameter of the particular abrasive wheel. This necessitates a tightening and removal of the clamping nut each time an abrasive wheel is placed on and removed from the balancing machine and consumes a considerable amount of time. In addition to this, the diameter of the bore in abrasive wheels is held to nominal diameter with a tolerance of plus .005 to minus .000 inch. Thus where nominal diameter collars are used to mount the abrasive wheel it is possible to observe a considerable apparent unbalance which is really caused by eccentrically clamping the wheel to the arbor where the bore is at a maximum diameter within allowable tolerances.

In order to provide for rapid mounting and demounting of the abrasive wheels and to eliminate the delay in the wrench and lock nut procedures heretofore utilized, the turn table of this invention is provided with a concave upper surface 92 as seen in FIGURE 2 and over this there is mounted a rubber pad 94. Since the relative position of an abrasive wheel with respect to the disc 48 must be maintained constant for satisfactory operation, as shall be pointed out in detail hereinafter, it is necessary that the rubber pad 94 be of a particular type which will provide the necessary adhesion during starting and braking and which will also satisfy certain additional criteria. We have found that a pad consisting of a layer of 1/16 inch natural gum rubber bonded on top of a layer of 1/4 inch neoprene foam rubber is satisfactory. Another suitable pad is a rubber manufactured by the Roth Rubber Company of Chicago, Illinois which is non porous and has a softness of 5 to 8 Durometer. This rubber has a coefficient of friction of 0.6–1.00, a tensile strength of 200 lbs. per square inch, and an elongation of 750%. In addition to the foregoing pads we have found that it is possible to utilize any pad having a Durometer of no higher than approximately 10 and a coefficient of friction of approximately 1. The porosity of the rubber should not be too great as this causes it to pick up the loading material which introduces an unbalance into the turn table itself. For this reason foam rubber is unsatisfactory as the upper layer of the pad. The low Durometer gives a good conformity to the abrasive wheel, provides a high shear force resistance and gives a sealing effect to be described in detail hereafter.

The upper surface 92 of the turn table 28 is concave so that the holding force is applied at a large radius. The degree of concavity should be sufficient to allow the edge of the abrasive wheel to sink into the rubber pad a considerable distance but should not be so great as to allow the loading powder to collect in globules beneath the abrasive wheel. That is to say, the concavity should be small enough to permit a relatively large portion of the periphery of the abrasive wheel to sink into the rubber so as to be sealed thereby during the loading operation. Under such circumstances the excess loading powder escapes from the edge of the abrasive wheel rather than collecting therebeneath.

Figure 4:
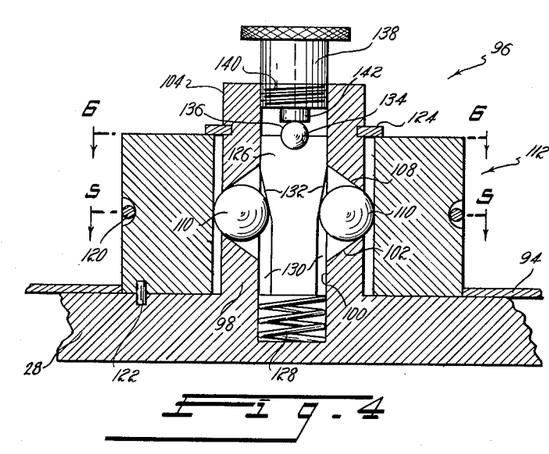
FIGURE 4 is a vertical cross section of the centering arbor taken along the line 4—4 of FIGURE 5.
Figures 5, 6:
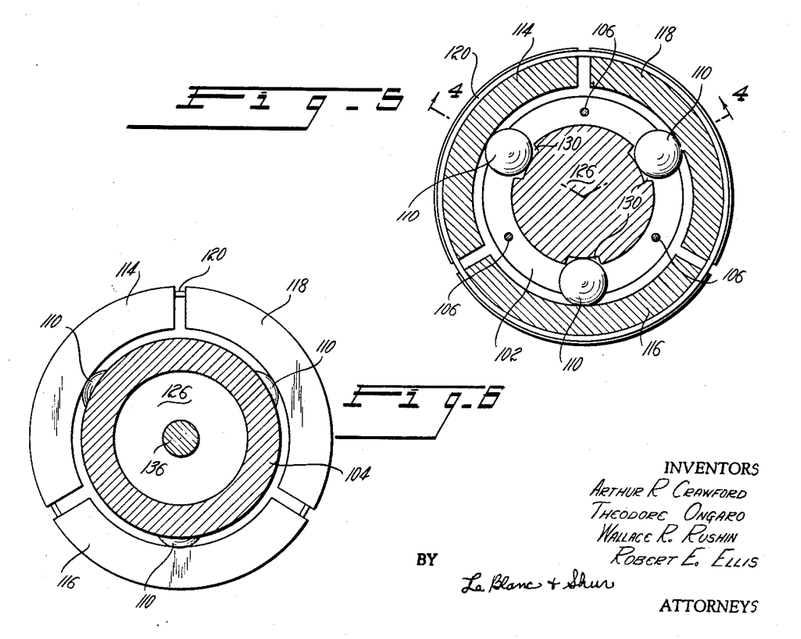
FIGURE 5 is a horizontal cross section of the centering arbor taken along the line 5—5 of FIGURE 4.
FIGURE 6 is a horizontal cross section of the centering arbor taken along the line 6—6 of FIGURE 4.

In order to eliminate the unbalance normally introduced by the positive tolerance in abrasive wheel bore diameters, the turn table of the invention is provided with an arbor assembly generally indicated at 96 and shown in detail in FIGURES 4, 5, and 6. Referring to FIGURE 4, it will be seen that the turn table 28 is provided with a centrally located stud 98 having a beveled upper surface 102. A ring 104 of the same inner and outer diameter as the stud 98 is mounted thereabove in spaced relation to the beveled edge 102 by means of screws 106, best seen in FIGURE 5. The lower edge of the ring 104 is beveled at 108 and the beveled edges 102 and 108 of the stud 98 and ring 14 respectively form a retainer for three ball bearings 110. A split collar shown generally at 112 and consisting of segments 114, 116 and 118 surrounds the stud 98 and ring 104 and engages the balls 110. The segments 114, 116 and 118 are held together by means of an O ring 120 and one segment is pinned to the table 28 at 122 to insure that the balls 110 are not aligned with the spaces between the segments. A snap ring 124 on the ring 104 holds the split collar 112 in position.

A plunger 126 is slidably received within the ring 104 and stud 98 and rests upon a coil spring 128. The plunger 126 is provided with equally spaced slots 130 having sloping cam surfaces 132. The balls 110 are received within the slots 130 and are urged outwardly into engagement with the sections 114, 116 and 118 of split collar 112 by means of the cam surfaces 132. The plunger 126 has a central cavity 134 at the top thereof receiving a ball 136. A lock screw 138 having a fine thread 140 is mounted in the ring 104 and engages the ball 136 by means of a stud 142 to provide vertical adjustment of the plunger. It will be understood that other means than a lock screw may be used to actuate the plunger, such as an air or hydraulically actuated mechanism.

From the foregoing description of the construction of the arbor it will be apparent that when a split collar of the proper nominal diameter is selected and placed over the stud 98 of the turn table 28 and an abrasive wheel is placed thereover, it is possible to accurately center the wheel by simply twisting the lock screw 138 to cause the balls 110 to expand the split collar into engagement with the bore of the abrasive wheel. Where a series of wheels of a particular size are being balanced, as is normally the case in production balancing, the wheel mounting operation consists of merely placing the abrasive wheel over the split collar 112 and tightening the screw 138. The abrasive wheel is then removed by loosening the screw 138 and removing the wheel. No additional clamping steps are necessary and the entire operation may be performed in an extremely short period of time.

*Amplitude and firing circuit*

Figure 9:
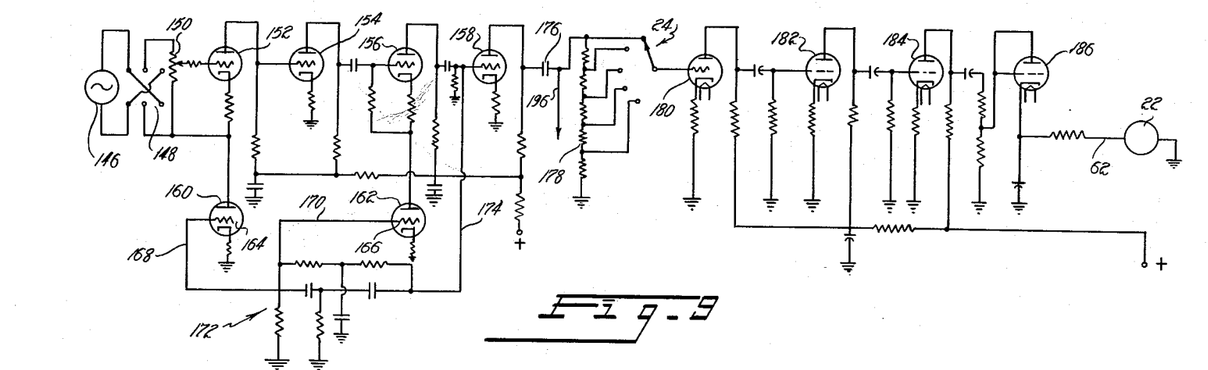
FIGURE 9 is a circuit diagram of the input and amplitude meter channels.

A pick up of any suitable type, such as for instance the seismic mounted induction type, a preferred embodiment of which is shown in application No. 312,021 filed September 29, 1952, now U.S. Patent No. 2,754,435, is connected to two terminals of a reversing switch 148 which supplies a signal to an input potentiometer 150. The signal on the potentiometer 150 passes through a series of amplifier stages 152, 154, 156 and 158 which comprise an amplifier having a flat gain-frequency characteristic. The amplifiers 152 and 156 have triodes 160 and 162 connected in their cathode circuits for the purpose of introducing a degenerative feed back signal.

The grids 164 and 166 of triodes 160 and 162 are connected by leads 168 and 170 to a parallel T network 172 which has its input connected to the grid of the amplifier 158 by means of a connection 174. The parallel T network 172 is a null or notch network having infinite attenuation at the null or notch frequency and having an extremely sharp null or notch, as is fully described in the text "Electronics Engineering Manual," vol. VII, McGraw-Hill, pages 242–245. When the amplifiers 152, 154, 156 and 158 are thus combined with the feed back tubes 160 and 162 in the null or notch amplifier 172, the unit comprises a flat gain-frequency characteristic amplifier wherein the feed back signal returned through the parallel T network 172 to the tubes 160 and 162 renders the amplifier highly degenerative at all frequencies except the null or notch frequency. At this frequency no degenerative signal reaches the tubes 160 and 162 and thus for this frequency the amplifier operates at maximum gain. A further description of this type of amplifier unit is found in copending application Serial No. 521,744 filed July 13, 1955, now Patent No. 3,023,613, although it will be understood that other type amplifiers, including untuned amplifiers, may be used. The output of the unit is coupled by condensor 176 to a voltage divider 178 and range selector switch 24. The signal from the selector switch 24 is fed through a series of amplifiers 180, 182, and 184 to a diode connected triode 186 which provides a signal for the amplitude meter 22.

Figures 11, 12:
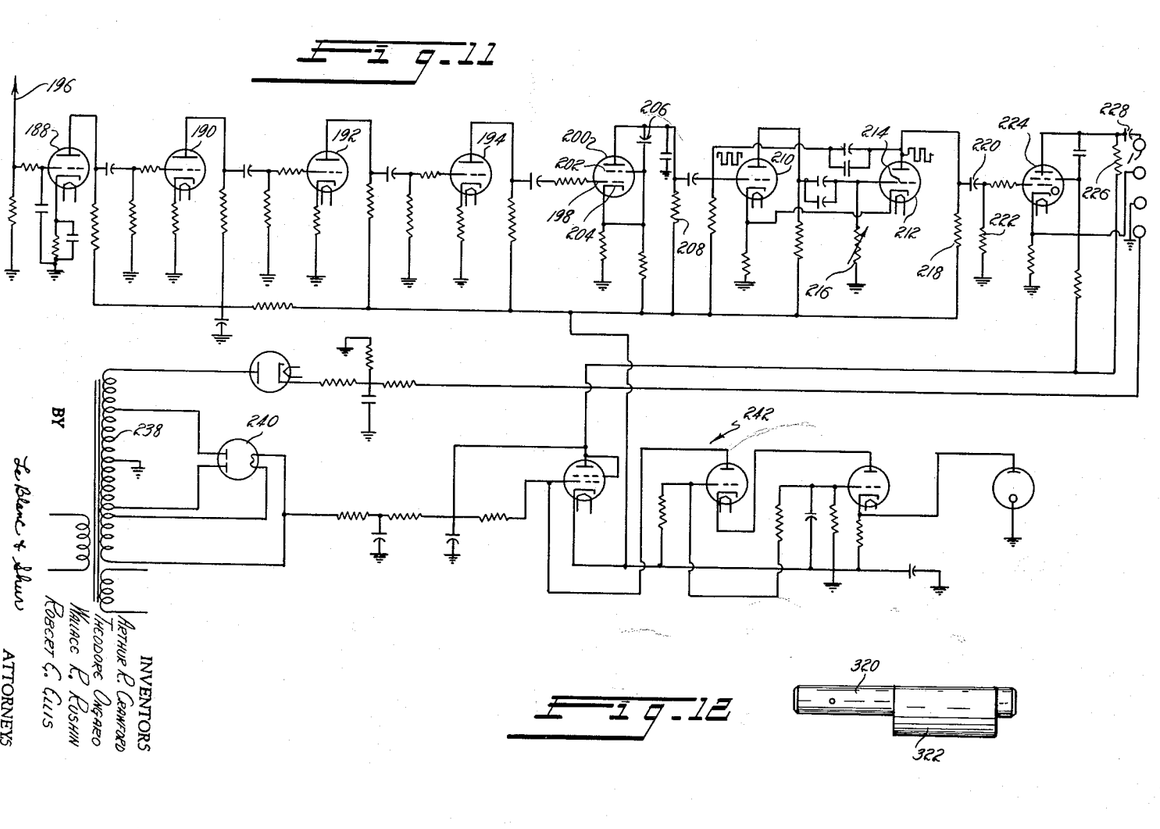
FIGURE 11 is a circuit diagram of the firing channel and power supply.
FIGURE 12 is a plan view of the eccentric and shaft.

The lamp firing unit shown in the upper half of FIGURE 11 consists of a series of amplifiers 188, 190, 192 and 194 which receive a signal from the filter unit shown in FIGURE 9 over the conductor 196 which is connected to the condensor 176. The output of the final amplifier tube 194 is fed to the control grid 198 of a trigger pulse producing tube 200 which may be a gas tube. The shield grid 202 and cathode 204 of this tube are connected together and a firing condensor 206 is connected across the plate and cathode of the tube. The positive pulses produced across the load resistor 208 are coupled to the grid of a triode 210 which constitutes one tube of a mono-stable multivibrator. The tube 212 forms the other half of this circuit which produces a substantially square wave at the plate of each tube. The grid 214 of tube 212 is connected to ground through a potentiometer 216 which provides a phase adjustment.

Figure 10:
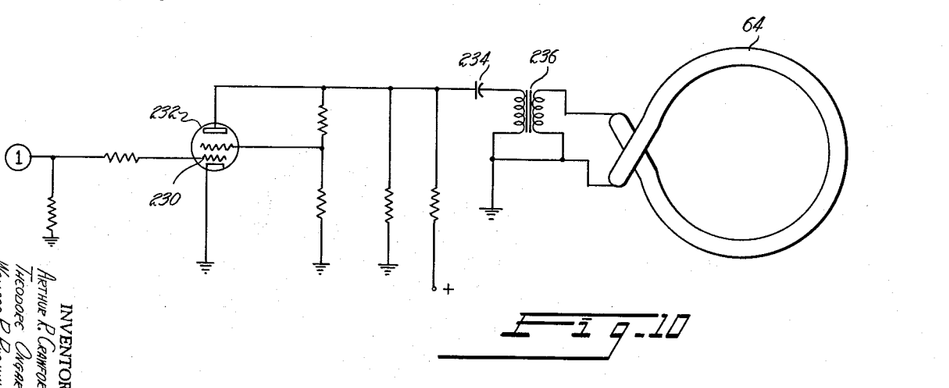
FIGURE 10 is a circuit diagram of the stroboscopic light firing channel.

The output from the multivibrator appearing on the resistor 218 is differentiated by condenser 220 and resistor 222 and the resultant sharp pulses are fed to a firing tube 224 which operates in the same manner as the tube 200 to produce a series of negative going pulses on the resistor 226. This signal is coupled by condenser 228 to the grid 230 of a firing tube 232, as seen in FIGURE 10. The tube 232 periodically discharges a firing condenser 234 through the firing transformer 236 to fire the neon tube 64. Plate and filament power for the various tubes is supplied by the power transformer 238, rectifier 240 and voltage regulator 242.

*Loader*

Figures 7, 8:
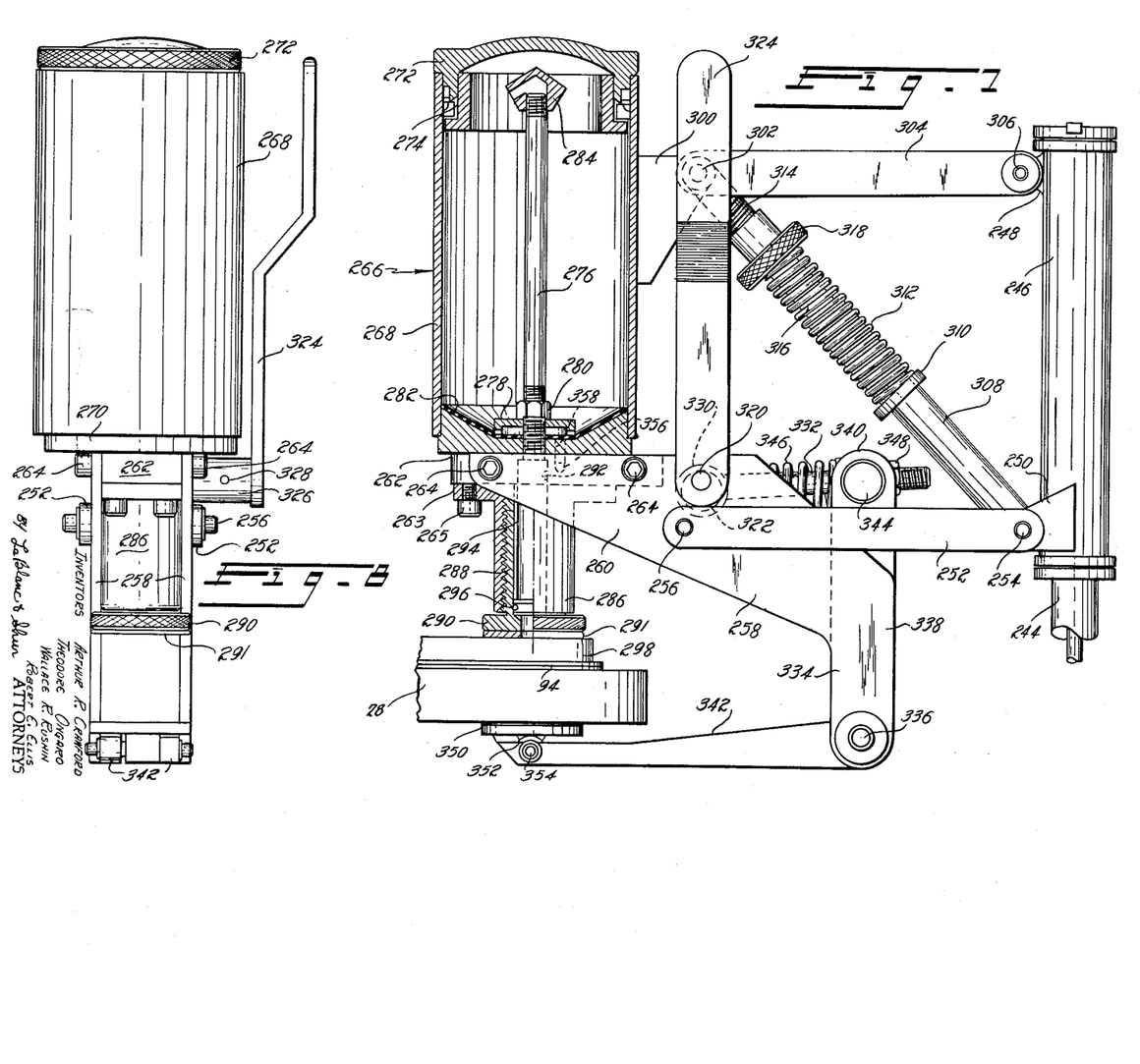
FIGURE 7 is a vertical elevation, partly in section, of the loader.
FIGURE 8 is a vertical elevation of the loader of FIGURE 7.

The loader assembly 18 is mounted on a support tube 244 to the left of the machine and is designed for positional adjustment in both horizontal and vertical planes. This unit provides an aerosol dispersion of powder which is carried into the porous abrasive wheel by an air stream and an air valve is provided at the left of the loader (not shown) for the purpose of injecting small or large quantities of this aerosol dispersion into the wheels.

The support tube 244 is received in a cylinder 246 which is pivotally mounted thereon and which carries upper lugs 248 and lower lugs 250. A pair of links 252 are pivotally connected to the lugs 250 by a pivot pin 254 at their right ends and are pivotally connected at 256 to a pair of plates 258. The plates 258 are provided with generally horizontally extending portions 260 which are bolted to a base block 262 by screws 264. A hopper 266 is mounted on the base block 262 and consists of a powder bowl 268, a hopper bottom 270 and a hopper top 272 which is sealed to the bowl 268 in a suitable air tight manner by a seal assembly 274. A powder feed tube 276 is screw threadedly received in an aperture in the center of the hopper bottom 270 and an air diffuser 278 is fastened onto the bottom of the powder feed tube by means of a nut 280. The hopper bottom 270 is protected from the abrasive action of the powder by means of a conical rubber disc 282. A dust inlet fixture 284 is screw threadedly mounted on the top of the powder feed tube 276 and air under pressure is supplied to the hopper through a passage 356 in base block 262 which communicates with a vertical passage 358 in the hopper bottom 270.

Mounted beneath the base block 262 by means of a flange 263 and nuts 265 is a sleeve holder 286 which receives an adjustable sleeve 288 having a knurled end 290 and rubber washer 291. The bottom end of the powder feed tube 276 communicates with an aperture 292 in the base block 262 and this aperture receives a powder guide bushing 294 which extends through the adjustable sleeve 288 and is sealed thereto by means of an O ring 296. By screwing the adjustable sleeve 288 into and out of the sleeve holder 286 it is possible to adjust the unit to handle abrasive wheels 298 of varying thicknesses.

The upper right portion of the bowl 268 carries a pair of support ears 300 which are pivoted at 302 to a pair of links 304 pivotally connected to the lugs 248 at 306. A tube 308 having a shoulder 310 is pivotally mounted on the lugs 250 by the pivot 254 and carries a support spring 312 over its outer end. An eye bolt 314 is pivotally mounted between the support ears 300 by the pivot 302 and has an end 316 slidably extending into the tube 308. The upper end of the support spring 312 abuts the knurled lock nut 318. It will thus be seen that the hopper 266 is carried by a parallellogram support consisting of the sleeve 246 and links 252 and 304, which makes vertical positioning of the hopper possible by adjustment of the lock nut 318.

An eccentric shaft 320, carrying an eccentric 322, shown in detail in FIGURE 12, is carried by the horizontal portions 260 of the plates 258. A handle 324 having a socket 326 at the lower end thereof is pinned to the shaft 320 at 328. Eccentric 322 is received within the eye 330 of an eye bolt 332. Pivotally mounted between the depending legs 334 of plates 258 at 336 is a pair of bell crank levers 338 having upper vertical arms 340 and lower horizontally extending arms 342. The vertical arms 340 of the bell crank levers 338 carry therebetween a trunion 344 through which the outer end of the eye bolt 332 passes. A clamp spring 346 is mounted between the trunion 344 and the eye 330 of the eye bolt and tension is applied by means of a nut 348. The distal ends of the horizontal arms 342 of bell crank levers 338 carry a pad 350 which is secured thereto by means of an eye 352 and pivot 354.

Operation

The basic theory of balancing has been explained heretofore. Suffice it to say that for each revolution of the turn table 28 and associated disc 48 the neon lamp 64 fires once and this firing always occurs at the same position which we have arbitrarily chosen as the moment the heavy spot on the abrasive wheel passes the pick-up. Each time the neon lamp fires the slit 66 in the disc 48 is illuminated to an observer and the appearance of a stationary red line is created on the dial 26. If the turn table is stopped and hand rotated until the slit 66 appears in the same position as was previously occupied by the red line, the heavy spot on the abrasive wheel is then opposite the pick-up and balancing may be accomplished by applying weight to a diametrically opposite position. Since the position of the pick-up is fixed, the position for weight addage may be arbitrarily placed proximate the loader mechanism by shifting the phase of the electrical signal actuating the neon lamp. This is accomplished by means of potentiometer 216 in the firing circuit by an adjustment made at the factory prior to the time that the machine is shipped. A coarse phase adjustment of 180° is provided by the reversing switch 148 and, in conjunction with the vernier phase control 216, it is always possible to place the point of loading directly beneath the loader mechanism. In a similar manner the amplitude meter 22 must be calibrated at the factory and this is effected by adjustment of potentiometer 150 at the input to the filter section of the amplitude channel.

In operating the balancing machine the operator performs three basic functions; arbor or collar selection, determination of the location and the amount of correction to be made, and loading the wheel to reduce the unbalance to a predetermined level. A set of arbors or split collars 112 is provided to handle the range of wheel bore diameters normally encountered and the operator's first step is to select the proper split collar, place it on the bushing 98, and lock it into position by means of the snap ring 124. The locking screw 138 is then screwed downwardly until the balls 110 snugly engage the wheel to thereby accurately center it on the turn table 28. The operator now starts the motor to bring the turn table up to the proper speed and then reads the amplitude of unbalance on the meter 22 and the position of unbalance by means of the red line. The motor is then switched off and the brake 47 simultaneously actuated to stop the wheel. The operator now hand rotates the turn table so that the slit in disc 48 is at the same position as was the red line.

The loader 18 is then pivoted on its support 244 to bring the pad 350 beneath the turn table and the adjustable sleeve 288 directly above the outer periphery of the wheel as shown in FIGURE 8. The handle 324 is then pulled to the left in FIGURE 7 whereby the eccentric 322 cams the vertical arm 340 of bell crank lever 338 to the right to raise pad 350 into engagement with the bottom of the turn table 28. This action tightly clamps the abrasive wheel between the turn table pad 94 and the rubber washer 291. The air valve is then opened to admit air into the hopper 266 through passages 356 and 358. The air rises through the powder in the hopper and an aerosol dispersion of powder is carried through the powder feed pipe 276 to the upper surface of the abrasive wheel 298. The air stream carries the aerosol dispersion into the wheel where the porous structure acts as a filter to retain the powder. Any suitable heavy powders may be used such as calcium carbonate, silica carbide, or barium sulfate.

Some of the powder escapes from the side or periphery of the wheel and if the abrasive wheel is not sufficiently sealed to the surface of the pad 94 on the turn table 28 air and powder will tend to escape from beneath the wheel thereby loading the pad and unbalancing the turn table assembly itself. For this reason it is desirable to have a reasonably tight clamping action between the sleeve 288 and the pad 350 and it is desirable to utilize a turn table having a concavity which is small enough to allow the pad 94 to seal the undersurface of the abrasive wheel over the entire area beneath the sleeve 288. The duration of time that the operator allows the air to continue to flow is determined by the amount of loading necessary (that is, the reading of the amplitude meter), and practice soon acquaints the operator as to the amount of powder necessary for a given correction.

After the wheel has been loaded in this manner the loader is pivoted back to its at rest position at the left of the machine and the motor is again turned on to bring the wheel up to speed for a check of the amplitude of unbalance. If this amplitude is below the predetermined tolerance the operator may then turn off the motor, causing a braking of the turn table, and may remove the wheel by loosening the screw 138 and simply lifting the wheel off of the split collar 112. If the check run shows that the unbalance is still in excess of the permitted tolerance the loading step is repeated until the degree of unbalance is satisfactory.

It will be appreciated that where an operator is production balancing a continuous flow of wheels of the same diameter and thickness the balancing operation is quite simple and may be performed within approximately 40 seconds.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A loader for adding localized weight to a porous object comprising, a container for a powdered material, means connected to said container for forming an aerosol dispersion of said material, an outlet member on said container for releasing said aerosol dispersion, bracket means on said container, an arm pivotally mounted on said bracket means and extending adjacent said outlet member, and means pivotally mounted on said loader for moving said portion of said arm adjacent said outlet member toward and away from said outlet member to clamp a porous object to said outlet member.

2. A loader as set out in claim 1 including a sleeve adjustably mounted in said outlet member for relative movement with respect to said outlet member.

3. A loader as set out in claim 1 wherein said last named means comprises a lever pivotally mounted on said bracket means and having a cam mounted thereon for effecting said movement of said arm.

4. A loader as set out in claim 2 wherein said arm comprises a first arm of a bell crank lever having a second arm, a cam follower engaging said cam, and link means connecting said cam follower and said second arm of said bell crank lever.

5. A loader as set out in claim 4 including a spring mounted on said link and urging said second arm away from said cam follower.

6. A loader as set out in claim 1 including a parallelogram linkage supporting said container.

7. A loader as set out in claim 6 including a yieldable member connecting diagonal corners of said parallelogram linkage.

8. A loader as set out in claim 7 wherein said parallelogram linkage comprises a support post, a sleeve rotatably mounted on said support post, a first link means connecting an upper portion of said sleeve to said container, and a second link means connecting a lower portion of said sleeve to said bracket means, said yieldable member being connected with said link means at said container and at said lower portion of said sleeve.

9. A loader as set out in claim 8 wherein said yieldable member comprises a tube slidably receiving a bar, a first stop on said tube, a second stop on said bar, and a spring urging said stops apart.

10. A loader for adding localized weight to a porous object comprising means for mounting said object, a container for a flowable material, an inlet in said container for admitting a gas under pressure, an outlet in said container for releasing gas borne material, conduit means connected to said outlet for conveying said gas borne material to said porous object, and means mounting said container for movement toward and away from said mounting means in horizontal and vertical directions, said means mounting said container comprising a parallelogram linkage pivotally mounted on a support.

11. A loader as set out in claim 10 including a spring urged yieldable connection between diagonally opposite corners of said parallelogram linkage.

References Cited in the file of this patent

UNITED STATES PATENTS

| | | |
|---|---|---|
| 985,829 | Nickerson | Mar. 7, 1911 |
| 1,151,205 | Loud | Aug. 24, 1915 |
| 1,838,648 | Atwood | Dec. 29, 1931 |
| 1,971,804 | Alexander | Aug. 28, 1934 |
| 2,258,548 | Doutrich | Oct. 7, 1941 |
| 2,369,462 | Hurst | Feb. 13, 1945 |
| 2,496,194 | Bennett | Jan. 31, 1950 |
| 2,598,621 | Taccone | May 27, 1952 |
| 2,674,500 | Hukari | Apr. 6, 1954 |
| 2,690,229 | Guise | Sept. 28, 1954 |
| 2,797,715 | Triteline | July 2, 1957 |
| 2,817,310 | Ponzini | Dec. 24, 1957 |
| 2,833,610 | Crosa et al. | May 6, 1958 |
| 2,844,431 | Hamlett | July 22, 1958 |